US006603226B1

(12) United States Patent
Liang et al.

(10) Patent No.: US 6,603,226 B1
(45) Date of Patent: Aug. 5, 2003

(54) ELECTRIC MACHINE DRIVE HAVING SENSORLESS CONTROL

(75) Inventors: Feng Liang, Canton, MI (US); Michael W Degner, Farmington Hills, MI (US)

(73) Assignee: Ford Motor Company, Dearborn, MI (US)

( * ) Notice: Subject to any disclaimer, the term of this patent is extended or adjusted under 35 U.S.C. 154(b) by 1 day.

(21) Appl. No.: 09/689,475

(22) Filed: Oct. 13, 2000

(51) Int. Cl.⁷ .............................................. H02K 11/00
(52) U.S. Cl. ...................... 310/68 B; 310/201; 310/211
(58) Field of Search ............................ 310/68 B, 67 R, 310/156.06, 156.57, 162, 214, 215, 217, 211, 212, 201

(56) References Cited

U.S. PATENT DOCUMENTS

| | | | |
|---|---|---|---|
| 4,485,796 A | * 12/1984 | Boyer | 123/617 |
| 5,256,923 A | * 10/1993 | Bartos et al. | 310/166 |
| 5,565,752 A | 10/1996 | Jansen et al. | |
| 5,585,709 A | 12/1996 | Jansen et al. | |
| 6,058,596 A | 5/2000 | Jansen et al. | |

* cited by examiner

Primary Examiner—Thanh Lam

(57) ABSTRACT

A rotor position dependent saliency in a sensorless control electric drive machine (9) introduces a plurality of sensing slots (16) to the outer periphery of a rotor (10). The number, depth, width and location of the sensing slots (16) is chosen to, either directly or through combination with the stator slots (20), create a desired saliency. The use of separate sensing slots (16) results in an effective decoupling between the sensing and torque producing functions in an electric drive motor (9), thereby significantly reducing the potential for ripple torque, clogging torque, or saturation effects. These sensing slots (16) do not have to be skewed if the rotor bars (14) contained within the rotor (10) are skewed; instead they remain parallel to the stator slots (20), resulting in a much larger saliency magnitude.

21 Claims, 2 Drawing Sheets

ELECTRIC MACHINE DRIVE HAVING SENSORLESS CONTROL

TECHNICAL FIELD

The present invention relates generally to electric machine drives and more particularly to an electric machine drive having sensorless control.

BACKGROUND

The elimination of rotor position, velocity, and flux sensors from electric machine drives has significant cost, reliability, and competitive advantages. Chief among these is the reduction in the cost associated with these expensive sensors and their associated wiring and connectors, which together are one of the leading causes of problems in electric machines and one of the most expensive to fix. These sensors and their associated wiring and connectors are also a major reliability concern due to their inherent fragile nature and sensitivity to harsh environments. The elimination of these sensors also provides a competitive advantage beyond those related to cost and reliability by allowing higher performance and efficiency control techniques to be used in applications where lower performance control techniques would have been used previously due to a lack of these sensors.

The control techniques used to eliminate rotor position, velocity or flux sensors are often described as "sensorless control." At high rotor speeds and excitation frequencies, these techniques have shown a lot of promise and have achieved some commercial success. Their inability to run at lower speeds and excitation frequencies excludes these techniques from being used in applications that require operation in these regions, including industrial drives, consumer appliances, and automotive applications (for example, electric traction drives for electric or fuel cell powered vehicles, hybrid electric vehicles, and electric power assisted steering).

To overcome the inability of operating at low rotor speeds and excitation frequencies, a second class of "sensorless controls" techniques has been developed that eliminates the dependence on the fundamental excitation of the electric machine. These techniques use a separate, high frequency sensing excitation applied to the machine in addition to fundamental excitation. There are many forms that the sensing excitation can take, but a fundamental requirement for those techniques to work is that the electric machine must have some form of saliency. For rotor position or velocity estimation, the saliency must have been related to and move when the rotor of the machine moves. For flux estimation, the saliency typically has some saturation-related dependence and hence contains information related to the position of the flux in the machine. Some examples of these machine types include synchronous reluctance machines, buried permanent magnet machines, switch reluctance machines, and salient pole synchronous machines.

Other machine types, for example induction machines, do not inherently have significant rotor position dependent saliencies present. In fact, it is often one of the design goals for machines such as these to minimize the magnitudes of the saliencies present. Due to this lack of an inherent rotor position dependent saliency, creating a saliency in these types of machines without significantly affecting the fundamental operation and torque production of the machine is necessary before rotor position or velocity "sensorless control" can be implemented.

Many methods are used to modify or design an induction machine rotor with a rotor position dependent saliency. For example, one method to create a rotor position dependent saliency is to vary the width of the rotor bar slot openings in a repeating manner. The variable width slot openings create a saliency by modulating the reluctance seen by the leakage flux as a function of the rotor position. The variation in width is done in such a way so that a complete cycle of the variation has a period equal to the pole pitch of the machine. Such a period results in a coupling between the saliency and the fundamental of the machine stator windings.

A second method used to create a rotor position dependent saliency is the modify the depth of fill that the rotor bars occupy in the rotor bar slot openings in a repeating pattern with a period again equal to the pole pitch of the machine. This creates a saliency due to the fact that the aluminum or copper occupying the rotor bar slot openings will have eddy currents induced in them due to the high frequency sensing signal injected into the machine for the "sensorless control." Because the amount of this fill in the rotor bar slot openings varies around the circumference of the rotor, the amount of eddy currents induced varies and produces the appearance of a high frequency saliency. This is akin to the use of a double rotor cage to increase the amount of starting line torque in line-started induction machines.

A third method of creating a rotor position dependent saliency is to vary the cross-sectional area of the rotor bars, thereby causing the rotor resistance to have a spatial dependence. One of the distinguishing features of this method from the other methods currently used for creating a rotor position dependent saliency is that it creates the saliency using the rotor resistance, whereas the other methods create a saliency by causing the leakage inductance to vary. As with the other methods for creating a saliency, the variation in rotor bar cross-sectional area is done so that it repeats every pole pitch of the machine.

A fourth method for creating a rotor position dependent is to create a saliency by selecting the number of rotor bars and stator slots so that their combination results in the desired saliency. For example, the combination of 28 rotor bars and 24 stator slots results in a rotor position dependent saliency that repeats 4 times around the circumference of the machine and would have a period equal to the pole pitch of the machine in a 4 pole machine.

The methods listed previously for creating a rotor position dependent saliency share several disadvantages in the way and type of saliency they create. First, all of the methods tie the desired saliency to the torque producing mechanism of the machine. Since the rotor bars play a fundamental role in the torque produced by the machine, the sensing and torque producing functions become inherently tied together. Some of the disadvantages of this relationship include increased ripple torque, increased clogging torque, increased sensitivity to saturation, and a limited potential for modification due to the number of rotor bars.

Another significant limitation caused by creating the desired saliency through the rotor bar design is that skewing of the rotor bars, as is often done in induction machines, significantly reduces any saliency created by these methods. Further, these methods tend to create relatively small magnitude saliencies, making it more difficult to use them for "sensorless control."

SUMMARY OF THE INVENTION

To overcome some of the disadvantages and limitations of the methods described above, a new method for creating rotor dependent saliencies in electric drive machines is presented.

The new method introduces a plurality of sensing slots around the outer periphery of the rotor. These sensing slots either directly or coupled with the plurality of stator slots create a rotor dependent desired saliency. The sensing slots effectively decouple the sensing and torque producing functions in an electric drive motor. This significantly reduces the potential for ripple torque, clogging torque, or saturation effects.

By varying the width, depth, and spacing within the sensing slots, the saliency of the various electric drive machines can be varied quite easily to produce a desired effect.

The advantages to creating a rotor position dependent saliency using separate sensing slots are numerous and significant. As described above, the sensing function or torque producing function is separated in the electric drive machine. Also, since the sensing slots are not tied to the rotor bars in any way, skewing of the rotor bars does not reduce the saliency magnitude significantly. Further, the effects of saturation on the saliency are minimized since the fundamental flux near the sensing slots will typically be parallel to the sensing slots.

Another significant advantage to creating a rotor dependent saliency using separate sensing slots is that the invention works equally well in pre-existing or new machine designs. Also, as the sensing slots can be introduced in a post-production step, wherein there is no need to keep track of the orientation of laminations during the assembly process, manufacturing techniques are greatly simplified, thereby decreasing the costs associated with manufacturing the rotor.

Other objects and advantages of the present invention will become apparent upon considering the following detailed description and appended claims, and upon reference to the accompanying drawings.

DESCRIPTION OF THE PREFERRED EMBODIMENT(S)

Figure 1:
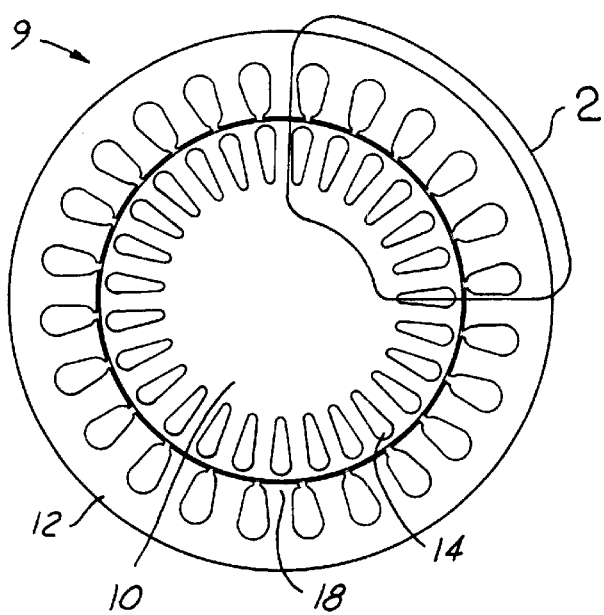
FIG. 1 depicts a top view of a stator and rotor of an electric machine drive having a plurality of rotor sensing slots according to one preferred embodiment of the present invention.
Figure 2:
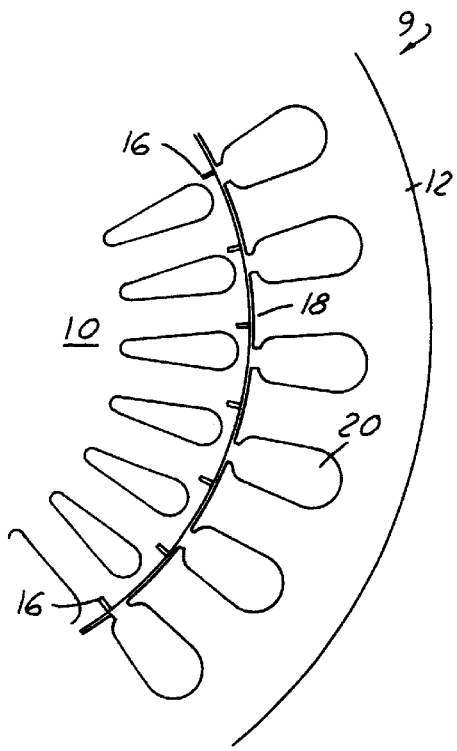
FIG. 2 is an enlarged view of a portion of FIG. 1.

Referring now to FIGS. 1 and 2, an electric machine drive 9 having a complete rotor 10 and stator 12 is depicted. The rotor 10 has a plurality of rotor bars 14 uniformly spaced around the rotor 10. Further, the rotor 10 has a plurality of rotor sensing slots 16 uniformly spaced along its outer periphery 18. The sensing slots 16 have a uniform depth and width. The stator 12 has a plurality of stator slots 20.

The number of sensing slots 16, here twenty-eight, is chosen so that their combination with the stator slots 20, here twenty-four, creates a desired saliency. The use of separate sensing slots 16 results in an effective decoupling between the sensing and torque producing functions. This significantly reduces the potential for ripple torque, clogging torque, or saturation effects.

Another major advantage to using separate sensing slots 16 is that the sensing slots 16 do not have to be skewed if the rotor bars 14 are skewed. Instead, the rotor sensing slots 16 may remain parallel to the stator slots 20 (even if the stator slots 20 are skewed), resulting in a much larger saliency magnitude.

Figure 3:
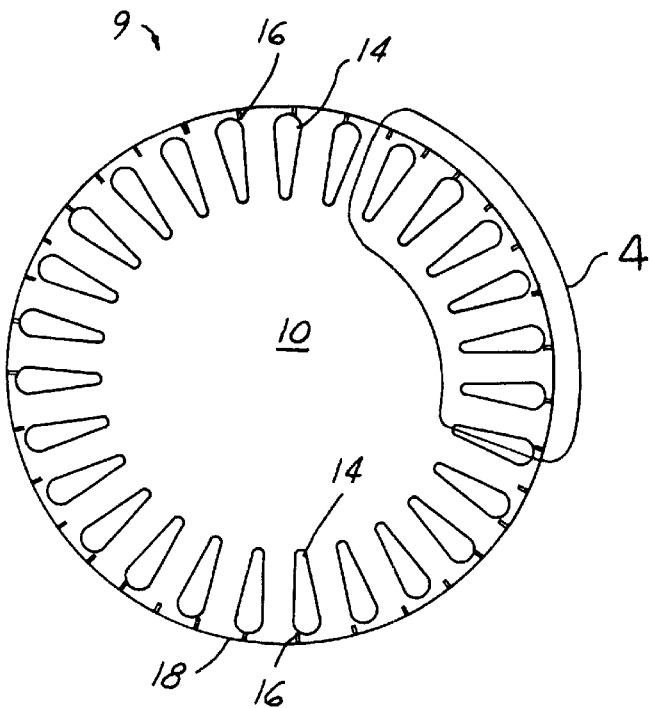
FIG. 3 depicts a top view of a stator and rotor of an electric motor drive having a plurality of rotor sensing slots according to another preferred embodiment of the present invention.
Figure 4:
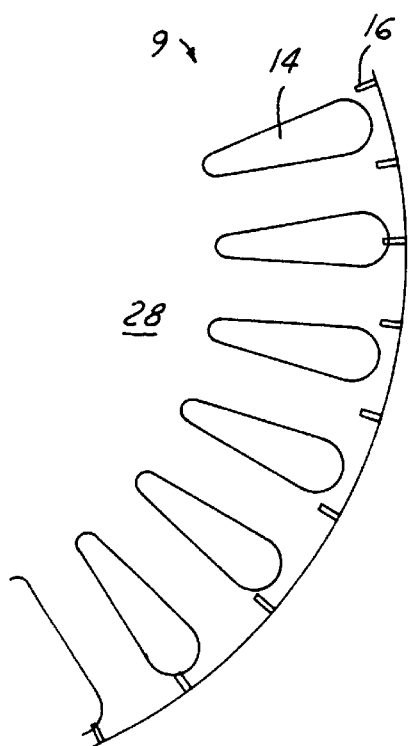
FIG. 4 is an enlarged view of a portion of FIG. 3.

In another preferred embodiment of the present invention, as depicted in FIGS. 3 and 4, the spacing between the sensing slots 16 is varied in a repeating manner, sinusoidal for example, to create the desired saliency. For example, a period of variation equal to the pole pitch of the electric machine drive 9 would result in strong coupling between the sensing slots 16 and the fundamental of the machine stator windings (not shown), creating a relatively large saliency ideal for "sensorless control." Such a variation is shown in FIGS. 3 and 4 as a four-pole induction machine. Since the sensing slots 16 are not used for any function other than to create the desired saliency, the number of sensing slots 16, in FIGS. 3 and 4 being thirty-five slots 16, can be chosen to optimize the desired saliency.

Figure 5:
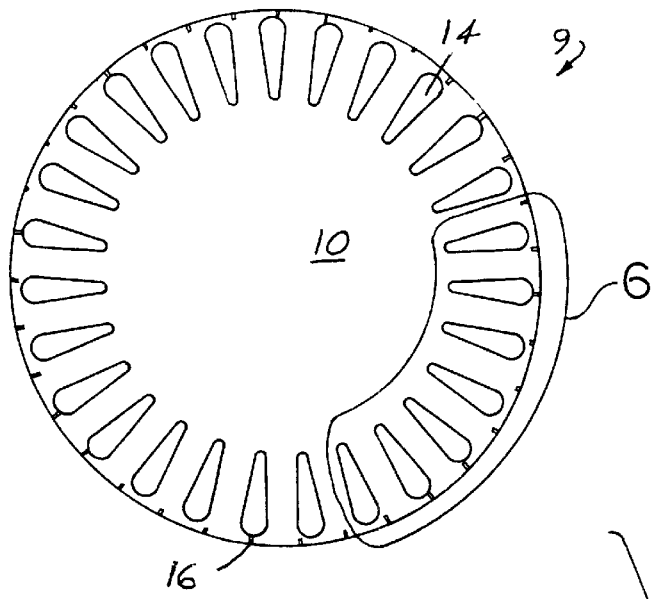
FIG. 5 depicts a top view of a stator and rotor of an electric motor drive having a plurality of rotor sensing slots according to another preferred embodiment of the present invention.
Figure 6:
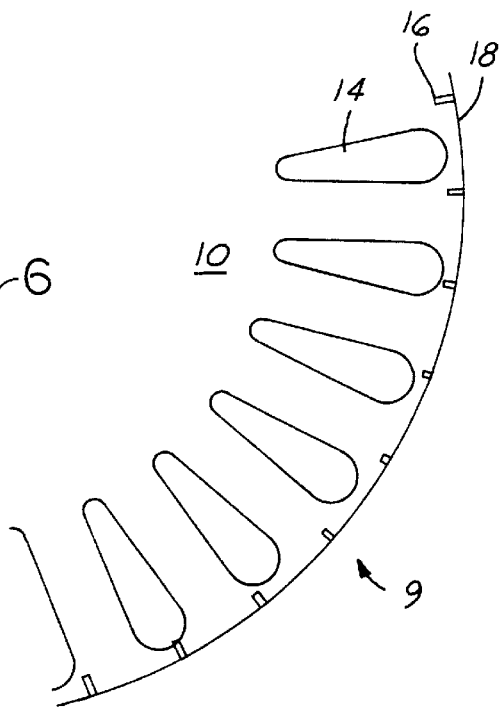
FIG. 6 is an enlarged view of a portion of FIG. 5.

In another preferred embodiment of the present invention, as depicted in FIGS. 5 and 6, the depth of the sensing slots 16 are varied in a repeating pattern. As an example, a period of variation equal to the pole pitch of the electric drive machine 9 would result in a strong coupling between the sensing slots 16 and the fundamental of the machine stator windings (not shown), creating a large saliency ideal for "sensorless control." Such a variation is depicted FIGS. 5 and 6 as a four-pole induction machine. As the sensing slots 16 are not used for any function other than to create the desired saliency, the number of sensing slots 16 can be chosen to optimize the desired saliency.

Figure 7:
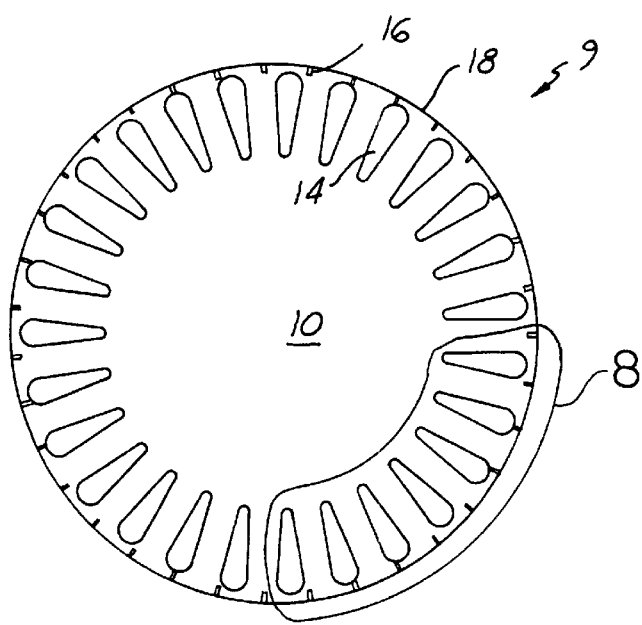
FIG. 7 depicts a top view of a stator and rotor of an electric motor drive having a plurality of rotor sensing slots according to another preferred embodiment of the present invention.
Figure 8:
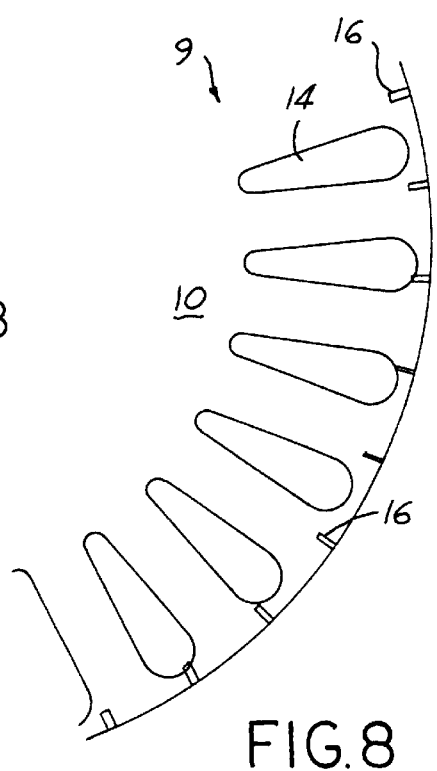
FIG. 8 is an enlarged view of a portion of FIG. 7.

A fourth preferred method for creating the desired rotor position dependent saliency using separate sensing slots 16 is depicted in FIGS. 7 and 8. In this preferred embodiment, the width of the uniformly spaced sensing slots 16 is varied in a repeating pattern. As an example, a period of variation equal to the pole pitch of the machine 9 would result in a strong coupling between the sensing slots 16 and the fundamental of the machine stator windings, creating a relatively large saliency ideal for "sensorless control." A four-pole machine is depicted in FIGS. 7 and 8. Again, as above, because the sensing slots 16 have no function other than to create the desired saliency, the number of sensing slots 16 can be chosen to optimize the desired saliency.

The advantages to creating a rotor position dependent saliency using separate sensing slots 16 are numerous and significant. First, since the sensing slots 16 are not used for any function other than to create the desired rotor position dependent saliency, the number of sensing slots 16 can be chosen independently of the number of rotor bars 14 and becomes an important design variable. This is in direct contrast to the prior art, wherein the number of rotor bars significantly limits the potential for creating saliency.

Second, as the sensing slots 16 are not tied to the rotor bars 14 in any way, skewing of the rotor bars 14 does not reduce the saliency magnitude significantly. Instead, the sensing slots 16 can be designed to remain parallel to the stator slots 20, even if the stator slots 20 are skewed, thereby maximizing potential for creating a desired saliency.

Third, the effects of saturation on the saliency is minimized since the fundamental flux near the sensing slots 16 will typically be parallel to the sensing slots 16. This is in contrast to methods listed in the prior art that created a saliency by varying the rotor bar slot openings in some manner. It is well known that leakage flux due to the fundamental excitation causes saturation in these structures at relatively low levels of excitation.

Fourth, the use of sensing slots 16 separates the sensing function from the torque producing mechanism of the machine 9. This significantly increases the ability to create saliency without significantly affecting the fundamental operation of the machine 9, resulting in lower torque ripple and clogging torque.

Finally, the creation of sensing slots can be used equally well in pre-existing or new machine designs. The methods listed in the prior art exhibit significant limitations when applied to pre-existing machines in an attempt to retrofit them for "sensorless control."

A related potential advantage to the use of separate sensing slots 16 is the possibility for simplified manufacturing when compared to most prior art methods. These methods require keeping track of the orientation of laminations during the assembly process in order to create the desired saliency. The sensing slots 16 of the present invention, on the other hand, can be created during a post-assembly step, thereby significantly reducing the complexity of the assembly process.

While the invention has been described in terms of preferred embodiments, it will be understood, of course, that the invention is not limited thereto since modifications may be made by those skilled in the art, particularly in light of the foregoing teachings. For example, the plurality of sensing slots 16 could be introduced to create rotor position dependent saliency in induction machines, Lundell-type synchronous machines, buried permanent magnet synchronous machines, and surface permanent magnet synchronous machines.

What is claimed is:

1. A method for modifying an electric machine drive rotor having a stator to create rotor-position-dependent saliency and allows sensorless control, the method comprising:

providing a plurality of rotor bars uniformly spaced around the rotor; and providing a plurality of sensing slots uniformly spaced around the rotors wherein at least one of sold plurality of sensing slots is located between an adjacent pair of said plurality of rotor bars positioned around the rotor.

2. The method of claim 1, wherein each of said plurality of sensing slots has a uniform width and depth around the rotor.

3. The method of claim 1, wherein each of said plurality of sensing slots has a uniform width around the rotor and wherein the depth of each of said plurality of sensing slots varies in a repeating manner around the rotor.

4. The method of claim 1, wherein each of said plurality of sensing slots has a uniform depth around the rotor and wherein the width of each of said plurality of sensing slots varies in a repeating manner around the rotor.

5. The method of claim 1, wherein said plurality of sensing slots are provided to the rotor is a post-assembly step.

6. The method of claim 1, wherein said plurality of sensing slots are coupled with a plurality of stator slots of the stator.

7. A method for modifying an electric machine drive rotor having a stator to create rotor-position-dependent saliency and allow sensorless control, the method comprising:

providing a plurality of rotor bars uniformly spaced around the rotor; and providing a plurality of sensing slots variably spaced in a repeating manner around the rotor, wherein the distance between an adjacent pair of said plurality of sensing slots is variably spaced with respect to the distance between a next adjacent pair of said plurality of sensing slots and wherein at least one of said plurality of sensing slots is located between an adjacent pair of said plurality of rotor bars positioned around the rotor.

8. The method of claim 1, wherein said plurality of sensing slots around the rotor are provided to the motor in a post-assembly step.

9. The method of claim 1, wherein said plurality of sensing slots are coupled with a plurality of stator slots of a stator.

10. A sensorless control electric machine drive comprising:

a stator having a plurality of stator slots; and a rotor having a plurality of rotor sensing slots located along the outer periphery, said rotor also having a plurality of rotor bars, wherein said plurality of rotor sensing slots are coupled to said plurality of stator side and wherein said plurality of rotor sensing slots are spaced uniformly around the outer periphery of said rotor and wherein at least one of said plurality of rotor sensing slots is located between an adjacent pair of said plurality of rotor bars positioned around the rotor.

11. A sensorless control electric machine drive comprising:

a stator having a plurality of stator slots; and a rotor having a plurality of rotor sensing slots located along its outer periphery, said rotor also having a plurality of rotor bars, wherein said plurality of rotor sensing slots are coupled to said plurality of stator slots and wherein said plurality of rotor sensing slots are variably spaced in a repeating pattern around the outer periphery of said rotor, wherein the distance between an adjacent pair of said plurality of sensing slots is variably spaced with respect to the distance between a next adjacent pair of said plurality of sensing slots and wherein at least one of said plurality of rotor sensing slots is located between an adjacent pair of said plurality of rotor bars positioned around the rotor.

12. The sensorless control electric machine drive of claim 11, wherein said repeating pattern comprises a sinusoidal repeating pattern.

13. The sensorless control electric machine drive of claim 11, wherein the depth of said plurality of rotor sensing slots is varied in a repeating pattern around said rotor.

14. The sensorless control electric machine drive of claim 11, wherein the width of said plurality of rotor sensing slots is varied in a repeating pattern around said rotor.

15. A sensorless control electric machine drive comprising:

a stator having a plurality of slator slots; and a rotor having a plurality of rotor sensing slots located along its outer periphery, said rotor also having a plurality of rotor bars, wherein said plurality of rotor sensing slots are spaced uniformly around the outer periphery of said rotor and wherein at least one of said plurality of rotor sensing slots is located between adjacent pair of said plurality of rotor bars positioned around the rotor.

16. The sensorless control electric machine drive of claim 15, wherein the depth of said plurality of rotor sensing slots is varied in a repeating pattern around said rotor.

17. The sensorless control electric machine drive of claim 15, wherein the width of said plurality of rotor sensing slots is varied in a repeating pattern around said rotor.

18. The sensorless control electric machine drive of claim 15, wherein the depth of said plurality of rotor sensing slots is varied in a sinusoidal repeating pattern around said rotor.

19. The sensorless control electric machine drive of claim 15, wherein the width of said plurality of rotor sensing slots is varied in a sinusoidal repeating pattern around said rotor.

20. A sensorless control electric machine drive comprising:
   a stator having a plurality of stator slots; and
   a rotor having a plurality of rotor sensing slots located along its outer periphery, said rotor also having a plurality of rotor bars, wherein said plurality of rotor sensing slots are variably spaced in a repeating pattern around the outer periphery of said rotor, wherein the distance between an adjacent pair of said plurality of sensing slots is variably spaced with respect to the distance between a next adjacent pair of said plurality of sensing slots and wherein at least one of said plurality of rotor sensing slots is located between an adjacent pair of said plurality of rotor bars positioned around the rotor.

21. The sensorless control electric machine drive of claim 20, wherein said repeating pattern comprises a sinusoidal repeating pattern.

* * * * *